(12) United States Patent
Hahn et al.

(10) Patent No.: US 8,834,779 B2
(45) Date of Patent: Sep. 16, 2014

(54) METHOD AND DEVICE FOR ASSEMBLING A HANDLING UNIT OF FILLED CONTAINERS

(75) Inventors: Wolfgang Hahn, Neutraubling (DE); Jochen Forsthovel, Regensburg (DE); Konrad Senn, Regensburg (DE); Markus Zolfl, Metten (DE); Frank Winzinger, Regensburg (DE); Bernd Sobiech, Regensburg (DE); Josef Hausladen, Worth Donau (DE); Stefan Raith, Pfatter (DE); Alexandra Donhauser, Regensburg (DE); Clemens Berger, Lappersdorf (DE)

(73) Assignee: Krones AG, Neutraubling (DE)

( * ) Notice: Subject to any disclaimer, the term of this patent is extended or adjusted under 35 U.S.C. 154(b) by 291 days.

(21) Appl. No.: 13/278,419

(22) Filed: Oct. 21, 2011

(65) Prior Publication Data

US 2012/0101628 A1     Apr. 26, 2012

(30) Foreign Application Priority Data

Oct. 26, 2010 (DE) .......................... 10 2010 042 925

(51) Int. Cl.
| | |
|---|---|
| *B29C 49/08* | (2006.01) |
| *B65B 5/10* | (2006.01) |
| *B65B 65/00* | (2006.01) |
| *B65B 5/12* | (2006.01) |
| *B65B 21/12* | (2006.01) |
| *B65B 21/04* | (2006.01) |
| *B29C 49/78* | (2006.01) |
| *B65G 47/68* | (2006.01) |
| *B29L 31/00* | (2006.01) |

(52) U.S. Cl.
CPC ............ *B65B 65/003* (2013.01); *B29C 49/78* (2013.01); *B65B 5/105* (2013.01); *B65B 5/12* (2013.01); *B65G 47/68* (2013.01); *B29C 2949/78806* (2013.01); *B65B 21/12* (2013.01); *B29C 49/08* (2013.01); *B29C 2949/78554* (2013.01); *B65B 2220/14* (2013.01); *B29C 2949/78537* (2013.01); *B29L 2031/7158* (2013.01); *B65B 21/04* (2013.01)
USPC .......................................... 264/524; 264/532

(58) Field of Classification Search
None
See application file for complete search history.

(56) References Cited

U.S. PATENT DOCUMENTS

| | | | |
|---|---|---|---|
| 7,266,422 | B1 | 9/2007 | DeMotte et al. |
| 7,743,587 | B2 | 6/2010 | Hagenbrock et al. |
| 2010/0178149 | A1 | 7/2010 | Fritzsche |

FOREIGN PATENT DOCUMENTS

| | | |
|---|---|---|
| CN | 101384488 A | 3/2009 |
| CN | 101506071 A | 8/2009 |

(Continued)

OTHER PUBLICATIONS

European Search Report for 11181230.1, dated Mar. 23, 2012.

(Continued)

*Primary Examiner* — Monica Huson
(74) *Attorney, Agent, or Firm* — Marshall, Gerstein & Borun LLP (57) ABSTRACT

A method for assembling a handling unit of filled containers and a corresponding method, where the handling unit comprises different container types being different with respect to at least the height, base area, base area shape or the mechanical load capacity of the containers, and the supplied containers are arranged on a handling unit carrier. The arrangement of the containers with respect to the number and/or the position and/or the rotational position of the containers on the handling unit carrier is made in dependence on at least one of the above container parameters, and the handling units can be produced flexibly and with a high packing density.

13 Claims, 4 Drawing Sheets

(56) References Cited

FOREIGN PATENT DOCUMENTS

| CN | 201362377 Y | 12/2009 |
| DE | 102005039842 A1 | 3/2007 |
| DE | 202005019906 U1 | 4/2007 |
| WO | WO-9955603 A1 | 11/1999 |
| WO | WO-03013975 A1 | 2/2003 |
| WO | WO-2008122480 A1 | 10/2008 |

OTHER PUBLICATIONS

Search Report for DE 10 2010 042 925.2, dated Jun. 8, 2011.
Chinese Search Report No. 2011103283511, dated Oct. 25, 2011.

METHOD AND DEVICE FOR ASSEMBLING A HANDLING UNIT OF FILLED CONTAINERS

CROSS-REFERENCE TO RELATED APPLICATION

The present application claims the benefit of priority of German Application No.102010042925.2, filed Oct. 26, 2010. The entire text of the priority application is incorporated herein by reference in its entirety.

FIELD OF THE DISCLOSURE

The disclosure relates to a method and a device for assembling a handling unit of filled containers in a filling plant, especially for beverages or pharmaceutical products.

BACKGROUND

Order picking of filled containers, e.g. beverage bottles, in filling lines is usually accomplished by palletizing robots or packaging robots which assemble the filled containers in handling units, e.g. collective handling units or transport handling units. For instance, similar containers are initially consolidated in collective handling units such as boxes, cardboard packagings, foil wrappings or the like, and are then packaged as a transport handling unit on a pallet for the delivery thereof.

The number of the containers transportable on a pallet is limited, for instance, by the packing density of the containers in a handling unit layer and by the maximally permissible top load carrying capacity of the containers. For instance, if bottles having round cross-sections are transported, it is inevitable that large surface areas of the pallet are not used for the transport. If the containers are arranged on the transport pallet in multiple layers the number of the layers is limited, inter alia, because the containers placed on the containers of the lowermost layer must not exceed a certain weight. In general, this limitation is predetermined by the top load carrying capacity of the containers.

As filling plants for beverages or pharmaceutical products become increasingly complex and allow the production of diverse containers, it would be desirable to render the picking and packaging of the containers more flexible as well, especially with respect to an improved exploitation of the available pallet surface area and the permissible volume and weight of the handling unit. Thus, there is a need for a method for assembling handling units, which has been improved in this regard, and for a correspondingly improved device for packaging and picking filled containers.

SUMMARY OF THE DISCLOSURE

The above need is achieved with a method according to the present disclosure. Accordingly, the filled containers are supplied in a step a), the containers comprising at least a first and a second container type, and the first and second container type being different with respect to at least one container parameter from the following group of parameters: height, base area, base area shape and the mechanical load capacity of the container. Moreover, a step b) is provided for arranging the supplied containers on a handling unit carrier, wherein the arrangement of the containers with respect to the number and/or the position and/or the rotational position of the containers on the handling unit carrier is made in dependence on the at least one container parameter of the first and second container type. Thus, it is possible to combine different types of containers on one handling unit carrier and, consequently, increase the order picking flexibility.

The handling unit may be both a collective handling unit, e.g. a box, a cardboard packaging or a foil wrapping with containers, and a transport handling unit, e.g. a pallet provided with containers or collective handling units. The handling unit carrier may be a pallet, a box, a cardboard box or a foil wrapping. In a manner known per se the handling unit may comprise fastening means, e.g. straps or foils, so as to fix the containers on the handling unit carrier. The position of the respective container on the handling unit carrier may be both a position inside a layer of the containers on the handling unit carrier and a vertical position of the container relative to the handling unit carrier, that is, it belongs to a specific layer of containers on the container carrier. The containers can be, for instance, glass bottles, plastic bottles, especially those of PET, canisters, barrels, plastic bags or similar containers.

Specifically, the mechanical load capacity of the container is a top load carrying capacity and/or a greater resisting force of the container with respect to forces acting from the sides, for instance, caused by objects pressed against them or by mechanical impacts.

The phrasing "arrangement in dependence on" within the meaning of the disclosure is to be interpreted such that in a handling unit to be produced, with a plurality of container types, there exist a certain number of possible positions for each container type which are to be loaded with the respective container types in a non-specified order. For instance, the location of the positions can be predetermined for specific production processes in advance, or can be varied according to demand in dependence on a picking order to be executed. The respective possible positions are predetermined in such a way that the containers to be picked are consolidated in a handling unit with a highest possible packing density, mechanical stability and/or optimized top load carrying capacity. The container parameters specified above serve here as a selection criterion for allocating the possible positions.

Preferably, the first container type has a greater top load carrying capacity and, in particular, is higher than the second container type. With this configuration, the more stable containers of the first container type are capable of coping with a load lying on top of them. Accordingly, a damage to the containers of the second container type caused by a load lying on top can be avoided. In this respect it is particularly advantageous if the load does not touch the containers of the second container type.

According to a particularly advantageous embodiment the first container type has a greater top load carrying capacity than the second container, and the containers are arranged in at least one upper and one lower layer on the handling unit carrier in such a way that the number of the containers of the first container type in the lower layer is greater than in the upper layer. Thus, the top load carrying capacity in each layer can be optimized with respect to the load effectively lying on top thereof. Consequently, the overall load in a handling unit can be distributed such that the number of containers per handling unit carrier is maximized.

According to a particularly advantageous embodiment the first container type has a greater top load carrying capacity than the second container, and the containers are assembled to form, in a top view, a polygonal handling unit, with containers of the first container type being arranged at corner positions of the handling unit. Thus, the stability of the handling unit with respect to transport damages can be increased. Moreover, the arrangement of the more stable containers of the first container type at the corner positions results in an altogether more stable arrangement of the containers on the handling unit carrier, especially if the containers are arranged on the handling unit carrier in multiple layers.

Advantageously, the pressure in the containers of the first container type is higher than in the containers of the second container type. Especially with respect to plastic containers this allows for providing containers that have a greater mechanical load capacity, in particular a greater top load carrying capacity. However, increasing the top load carrying capacity can also be achieved with a greater wall thickness of the containers of the first container type or by using a correspondingly more stable material. For instance, the containers of the first container type could be made of glass, while the containers of the second container type are made of plastic. As reusable containers generally have a greater wall thickness than disposable containers, and thus a greater top load carrying capacity, the containers of the first container type can preferably be reusable containers and the containers of the second container type disposable containers.

Preferably, the containers of the first container type are bottles and the containers of the second container type are bags. Thus, flexible containers having a low mechanical load capacity can be stabilized and protected by rigid containers having a comparatively great mechanical load capacity. Especially if the filled containers are arranged on the handling unit carrier in multiple layers, bags can thus also be integrated into lower layers that have correspondingly high loads lying on top. Moreover, bags, when arranged between bottles, are flexibly deformable so as to permit a particularly efficient exploitation of the available base area of the container carrier. In other words, bags are capable of adapting their shape at least in sections to the wall of adjacent bottles on the handling unit carrier so as to minimize the free space between the bags and the bottles.

According to a preferred embodiment the containers of the first and of the second container type have different base areas. Moreover, at least the base area of the first or of the second container type is polygonal, and at least two boundary lines of adjacent polygonal base areas are oriented in parallel or orthogonally relative to each other. Thus, in a top view, a particularly high packing density of the containers on the container carrier can be obtained. Specifically, this alternative permits a higher packing density as compared to the combination of bottles that exclusively have a round cross-section. This configuration allows, for instance, an arrangement of the containers of the first and the second container type in such a way that the ratio of the sum of the base areas occupied by the containers to the loading area of the container carrier enclosed by the common circumferential line around the base areas of the containers is greater than 0.8, specifically greater than 0.9. In other words, the percentage of the area of the remaining free space between the containers amounts then to only 20% of the base area of the handling unit, more specifically only 10%.

According to an advantageous embodiment the containers are assigned at least one identification sign corresponding to the respective container type. Moreover, the supply in step a) and/or the arrangement in step b) are controlled in dependence on the at least one identification sign. Thus, steps a) and/or b) can be carried out particularly fast and reliably. Specifically, a constant adjustment between the containers available for the picking and the required containers of a specific container type during the running production is possible.

Preferably, the identification sign is applied to the containers, and/or the identification sign is an electronic position marker of the respective container with respect to the running production flow. Identification signs applied to the containers, e.g. imprints or other markers that can be read out in a non-contacting manner, e.g. for the identification by means of electromagnetic waves (RFID), permit a reliable selection of the containers when supplying and/or arranging them on the handling unit carrier. The assignment of an electronic position marker in a control program can already be realized, for instance, during the production of the containers or as the containers are filled, so that the position of the respective container in the production flow is known any time after the position marker was assigned in the filling line. The position marker could also be assigned during an inspection of the containers in the filling line. Thus, the respective containers can already be distributed to suited conveyor lanes before they are supplied so as to simplify the assignment as the containers are supplied and/or arranged on the handling unit carrier. In other words, electronic position markers could be generated in a control program in any production step suited for this purpose.

Preferably, the supply in step a) and/or the arrangement in step b) are performed automatically on the basis of a picking order. Thus, optimized handling units can be assembled, for instance, according to special customer requirements. For instance, the top load carrying capacity of the containers could be optimally utilized in order to be capable of delivering the required quantity of containers in as few transport handling units as possible.

According to a preferred embodiment the containers of the first and of the second container type are supplied in step a) by a shared disposable container line, or the containers of the second container type are supplied by a disposable container line and the containers of the first container type are supplied by a parallel-operated reusable container line. Thus, additional production steps for intermediately storing and buffering the containers can be avoided or at least be reduced to some extent. In a combination of a reusable container line with a disposable container line, for instance, the generally more stable reusable containers may be used as the containers of the first container type, especially for increasing the top load carrying capacity of a handling unit layer. For instance, glass bottles could be handled by the reusable container line and plastic bottles by the disposable container line. Also, one container line could bottle carbonated products and the other one non-carbonated products. Due to the internal pressure the carbonated bottles are more stable than the bottles containing non-carbonated products. Also, the containers could be supplied by two reusable lines in step a).

One object of the disclosure is also achieved with a method for producing a handling unit of filled containers in a filling plant which, in addition to the above-described inventive method, further includes a method for stretch blow molding the containers to be filled from preforms. The preforms are preheated independently of each other and, during the blowing, are stretched by means of separate linear motor drives, and/or the containers are blown at different pressures and/or blowing times. A configuration of this kind is suited particularly well for supplying different containers from one shared filling plant. For instance, containers of different sizes and with different wall thicknesses could be obtained from identical preforms, subsequent to a different preheating and different stretching of the preforms. It would be conceivable, for instance, to produce a first container type having a comparatively great wall thickness and small volume and a second container type having a comparatively small wall thickness and great volume.

Furthermore, the device according to the disclosure comprises a supply unit for supplying diverse filled containers comprising at least a first and a second container type which are different with respect to at least one of the following container parameters: height, base area, base area shape and the mechanical load capacity of the container. Moreover, a positioning unit is provided for arranging the supplied containers on a handling unit carrier, the positioning unit being adapted to be capable of arranging the containers with respect to the number and/or the position and/or the rotational position of the containers in dependence on the at least one different container parameter of the first and second container type. The supply unit can be, for instance, a conveyor with several lanes, wherein the individual container types are supplied in respectively associated lanes. The supply unit may also comprise buffers in order to be capable of supplying an adequate number of the respectively required containers in varying production conditions. The positioning unit can be, for instance, a palletizing robot or a packaging robot, which is capable of systematically withdrawing the containers from the supply unit and placing them on the handling unit carriers. The device according to the disclosure makes it possible to achieve the same advantages that are achieved with the described method according to the disclosure. To this end, the device according to the disclosure is preferably adapted to perform at least one of the above-described method modifications.

Preferably, the device according to the disclosure comprises an identification unit for assigning to the containers at least one identification sign corresponding to the container type.

According to a particularly favorable embodiment the identification unit is adapted in such a way that a marker can be applied to the containers, and/or that a control signal can be generated as an electronic position marker which assigns a position to the respective container in the running production flow. The identification unit can be, for instance, a labeling device. An inspection device is conceivable as well, which assigns to the container, as it runs through the inspection device, a corresponding control signal as an electronic position marker. An electronic identification sign could also be generated when the containers are produced. It is important that the identification unit provides the respective container with an identification sign in such a way that a unique assignment in the region of the supply unit and, thus, a correct selection of the container type to be positioned by the positioning unit is possible.

Preferably, also a control device is provided, which is adapted in such a way that the supply unit and/or the positioning unit can be controlled with the aid of the respectively assigned identification sign. This allows an automation of the order picking process, for instance, by carrying out an order for the production of a certain handling unit in dependence on the containers that are respectively available at the supply unit. In other words, different handling units can be assembled in an optimized order and/or in a shortest possible time. Preferably, also container-specific parameters are stored in the control device, for instance, in the form of characteristic properties of the container type and/or the filling material. Thus it is possible to optimize not only the handling units in respect of the packing density, but also the chronological sequence of the order picking process.

Preferably, the supply unit is arranged in the product flow downstream of a disposable container line for filling the containers of the first and the second container type, or downstream of a reusable container line for filling the containers of the first container type and a disposable container line for filling the containers of the second container type. These configurations permit a particularly flexible loading of the handling unit carriers with different containers. Specifically, containers having different top load carrying capacities can thus be suitably combined on a handling unit carrier. Alternatively, also two reusable lines are possible.

An aspect of the disclosure is further achieved with a device for producing handling units, in which there are further provided, in addition to the above-described device, a stretch blow molding machine, which has a preheater with individual heating chambers for preheating incoming preforms independently of each other, as well as stretching mandrels individually driven by linear motors. Such a stretch blow molding machine is suited particularly well for producing diverse containers, so that containers of different container types can be provided continuously in one continuous production line. This reduces the required expenditure for intermediately storing and buffering different container types.

BRIEF DESCRIPTION OF THE DRAWINGS

Preferred embodiments of the disclosure are illustrated in the drawings. In the drawings.

DETAILED DESCRIPTION OF THE PREFERRED EMBODIMENT

Figure 1:
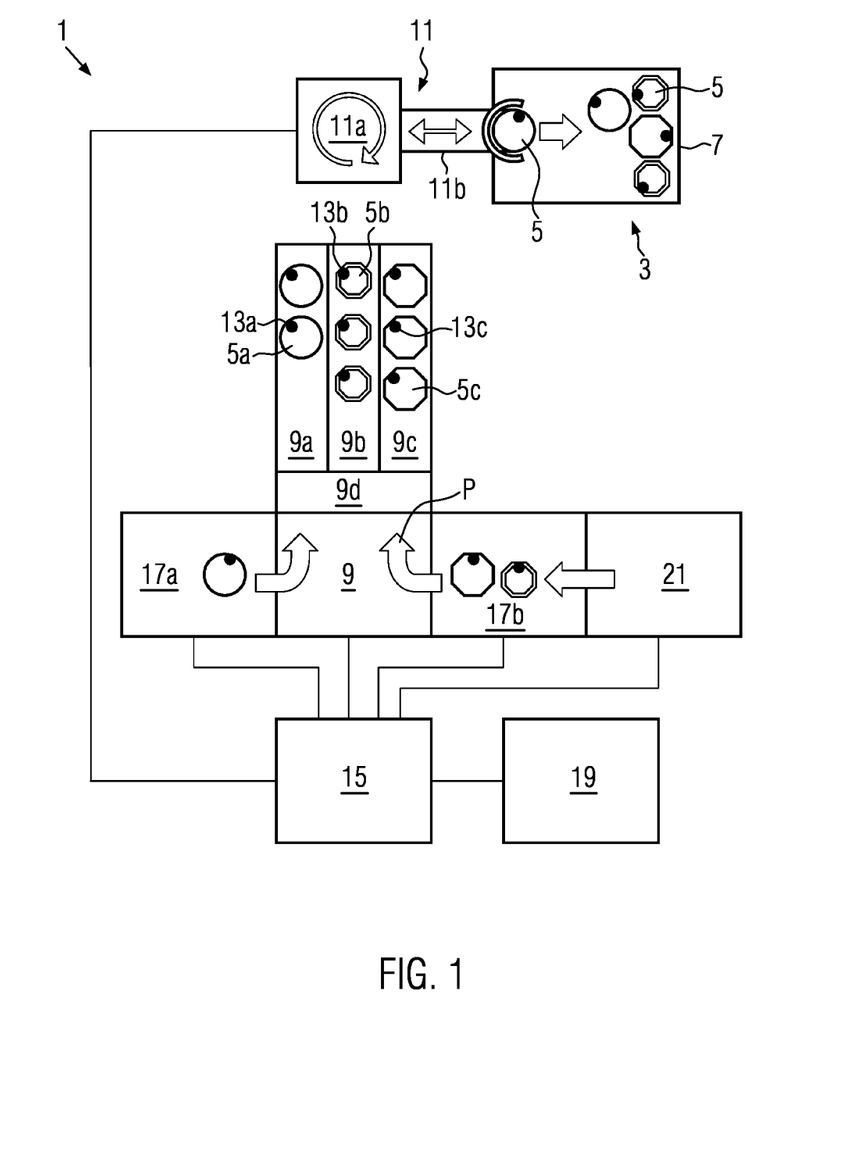
FIG. 1 shows an embodiment of a device according to the disclosure for assembling handling units.

As can be seen in FIG. 1, one embodiment of the device 1 according to the disclosure for assembling handling units 3 of filled containers 5 on handling unit carriers 4 comprises a supply device 9 for supplying different container types 5a-5c and a positioning unit 11 for selectively receiving the containers 5 of the container types 5a-5c and for positioning them on the container carrier 7.

The supply device 9 is, for instance, a transport and/or buffer unit with several lanes 9a-9c for selectively supplying different containers 5 which, for the sake of simplicity, will also be referred to as container types 5a-5c below. The supply in separate transport lanes 9a-9c serves a simpler reception of the container types 5a-5c by the positioning unit 11. Such separate lanes 9a-9c are not stringently required, however, which is the case, particularly, if at least one identification sign 13a-13c is provided for each container in order to identify the respective container type 5a-5c.

The identification signs 13a-13c uniquely assign each container 5 to one of the container types 5a-5c. Thus, it is possible to receive the containers 5 selectively, by identifying the identification signs 13a-13c, and place them onto the handling unit carrier 7. In FIG. 1 the identification signs 13a-13c are represented as markers provided on the containers 5, which markers could be, for instance, a visually identifiable imprint or a label read out electromagnetically, specifically in a non-contacting manner, or the like.

The identification signs 13a-13c need not be tangibly provided on the containers 5, however. The identification signs 13a-13c could also be electronic position markers which are assigned, within the bounds of a control program, to each of the containers 5 in the course of the production and filling process at an appropriate place of the production line. In other words, an electronic position marker permits, within the meaning of the disclosure, a determination of the relative position of the container 5 in the production flow P. This also allows to determine the point in time at which the container 5 is available at the supply unit 9 for being positioned on the handling unit carrier 7. Such position markers could be assigned, for instance, during the production of the not yet filled containers 5, during the filling of the containers 5, or during an optional inspection procedure during the production, but also by means of a separate inspection device 9d in the region of the supply unit 9.

The positioning unit 11 is, for instance, a robot which is capable of transferring the containers 5 in an automated manner from the supply unit 9 to the handling unit carriers 7. Such robots are known from the prior art and, therefore, are not explained in more detail. A rotatable platform 11a and a radially displaceable gripper arm 1 1b as components of the positioning unit 11 are schematically outlined in FIG. 1 merely for the sake of clarity.

In order to control the positioning unit 11 a control unit 15 is provided, which preferably also communicates with the supply unit 9. The control unit 15 permits that containers 5 of the container type 5a-5c provided for loading the handling unit carrier 7 be supplied at the supply unit 9, specifically also according to need, and that the positioning unit 11 is instructed to grip the supplied container type 5a-5c and place it onto the handling carrier unit 7 at a free position assigned to the respective container type.

The control unit 15 could calculate process parameters for the optimized loading of the handling unit carriers 7. For instance, an automatic top load calculation would be conceivable in order to calculate the number of the layers in which the containers 5 in a handling unit 3 may be placed on top of each other without causing damage to the containers 5. Also, it is conceivable to automatically distribute the containers 5 to different layers so as to adapt the load-carrying capacity thereof to the respective load to be carried. By means of the control unit 15 the containers 5 could also be distributed to the transport lanes 9a-9c in the number respectively needed.

Preferably, the supply unit 9 is fed by at least one filling line 17a, 17b. FIG. 1 exemplarily shows two filling lines 17a, 17b upstream of the supply unit 9, wherein the filling line 17a supplies reusable containers of the container type 5a and the filling line 17b different disposable containers of both container types 5a, 5c. However, this example is merely illustrative. Of course, it would be possible to operate the device 1 according to the disclosure and the method according to the disclosure also with one single filling line 17a, 17b. The container type 5a could be, for instance, a glass bottle with a round cross-section, the container type 5b could be a thick-walled plastic container with a polygonal cross-section, and the container type 5c could be a thin-walled plastic container with a greater volume than that of container type 5b. As will be explained in more detail below, manifold combinations of different container types deviating therefrom are possible, however, which may differ from each other in terms of materials, sizes and/or shapes. It is essential that at least two different container types 5a-5c are supplied so as to load the handling unit carrier 7 with different containers 5. The advantages of individual handling unit alternatives will be explained in more detail on the basis of FIGS. 2 to 7b.

Moreover, FIG. 1 shows an order specifying unit 19, a stretch blow molding machine 21 and the inspection unit 9d as optional components of the device 1 according to the disclosure. For instance, the order specifying unit 19 could transmit a picking order of a customer to the control device 15 to arrange a predefined number of the container types 5a-5c on at least one handling unit carrier 7 in an optimized manner. The control device 15 could, for this purpose, assemble optimized handling units 3 from predetermined total quantities of the respective container types 5a-5c in order to optimize the packing density on individual container carriers 7 and/or assemble the handling units 3 in a shortest possible time.

Preferably, the stretch blow molding machine 21 is configured in such a way that different container types 5b, 5c can be produced in this machine. For instance, this is possible with a configuration in which preforms can be heated individually differently in a non-llustrated heater, e.g. in separate heating chambers per preform, and in which the preheated preforms are stretched in the blow mold by means of stretching mandrels, which can be driven individually differently by means of linear motors. Thus, the different container types 5b, 5c can be produced as a result of a continuously running production process by one shared production line. Correspondingly, the different container types 5b, 5c can be filled in the shared filling line 17b.

In a particularly advantageous manner the supply unit 9 and the positioning unit 11 for assembling handling units 3 can be combined with a blow molding machine 21 allowing the production of different container types 5b, 5c. Such a combination reduces the instrumentation expenditure for the production of different container types 5b, 5c as well as for intermediately storing and buffering the containers to be filled and/or filled containers 5. Therefore, the control device 15 preferably communicates with the blow molding machine 21, for instance, in order to assign electronic position markers 13b, 13c to the produced containers 5b, 5c during the running production flow and/or control the blow molding machine 21 according to need.

Figure 2:
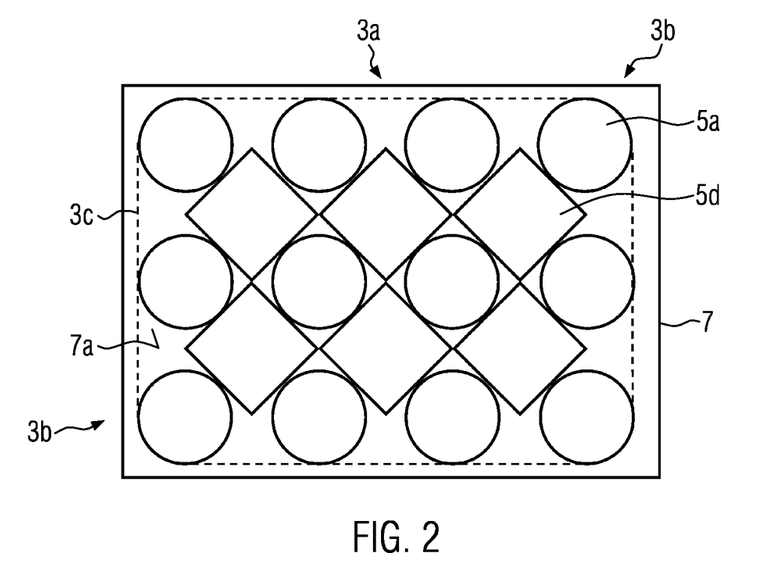
FIG. 2 shows a top view of a first example of a handling unit assembled according to the disclosure.

FIG. 2 shows a first example of a handling unit carrier 7 loaded with different container types 5a, 5d. This handling carrier unit 7 could be, for instance, a transport pallet, a packaging cardboard box, a correspondingly stable foil or the like. In the example according to FIG. 2 a first container type 5a having a round cross-section is arranged on the handling unit carrier 7 alternately, side by side, with a second container type 5d having a rectangular cross-section. The illustration according to FIG. 2 here represents a handling unit layer 3a, wherein the handling unit 3 comprises at least one handling unit layer 3a, but generally consists of several, where necessary different, handling unit layers 3a, 3a', as will be explained in more detail with respect to FIG. 7B.

FIG. 2 further illustrates that the combination of different container types 5a, 5d permits a particularly effective exploitation of the loading area 7a of the handling unit carrier 7. It would also be possible, however, to arrange different container types side by side in such a manner that the mechanical load capacity of the handling unit layer 3a is increased, especially with respect to loads lying on top of it, or in order to shield particularly sensitive containers 5 by less sensitive ones. It is conceivable, for instance, that the container type 5a exhibits a great top load carrying capacity than container type 5d. Containers 5 that have a great top load carrying capacity are preferably arranged in the edge region of the respective handling unit layer 3a, especially at the corner positions 3b of the handling unit layer 3a. Thus, containers 5 that have a low top load carrying capacity or, in general, a low mechanical resistivity, in this case container type 5d, can be protected better against transport damages. Moreover, the stability of a stack consisting of several handling unit layers 3a, 3a' can thus be increased.

The top load carrying capacity of the containers 5 can be influenced, for instance, by the container material and by the wall thickness. Containers 5 with a sequentially increasing top load carrying capacity are for instance: plastic bags; thin-walled plastic bottles (disposable bottles); thick-walled plastic bottles (reusable bottles); and glass bottles. Moreover, the top load carrying capacity of plastic bottles could be influenced by the filling pressure, e.g. in the form of a nitrogen introduction, but also by the $CO_2$ content of carbonated products. For instance, the positive pressure in a lower handling unit layer 3a could be 0.5 to 1.5 bar, in an upper handling unit layer 3a only 0.1 to 0.4 bar, however.

FIG. 2 further illustrates a circumferential line 3c of the handling unit layer 3a around the base areas of the containers 5 of container types 5a, 5d. In general, it is desirable to keep the free space between the containers 5 of a handling unit layer 3a as small as possible so as to maximize the packing density of the handling unit layer 3a. In other words, it is desired to maximize the ratio of the added base areas of all containers 5 of a handling unit layer 3a to the surface area enclosed by the circumferential line 3c to the loading area 7a as a whole. For instance, containers 5 having differently shaped and/or differently large base areas can be arranged side by side in such a manner that the ratio of the total base area of the containers to the surface area enclosed by the common circumferential line 3c around the base areas of the containers 5 is greater than 0.8, or preferably greater than 0.9.

Figure 3:
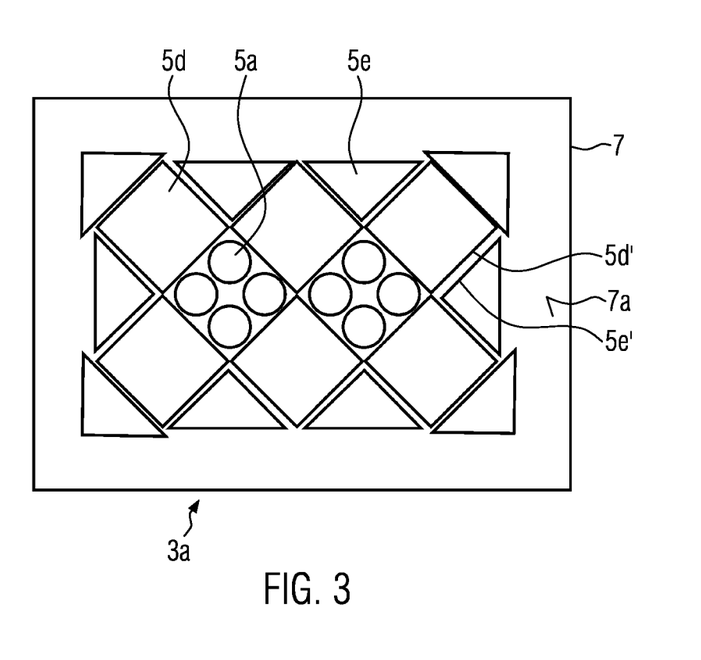
FIG. 3 shows a top view of a second example of a handling unit assembled according to the disclosure.

FIG. 3 shows a handling unit layer 3a on which a third container type 5e having a triangular base area is provided. Combining different base areas of the container types 5a, 5d, 5e allows a particularly efficient exploitation of the available loading surface 7a of the handling unit carrier 7. As can also be seen in FIG. 3, the loading surface 7a can be used particularly efficiently if different container types 5d, 5e, each having a polygonal base area, are oriented in such a manner that at least two boundary lines 5d', 5e' of adjacent containers 5 having a polygonal cross-section are oriented relative to each other substantially in parallel or orthogonally. In this way the container types 5d, 5e having different polygonal base areas can be packed side by side with particularly small clearances.

Figure 4:
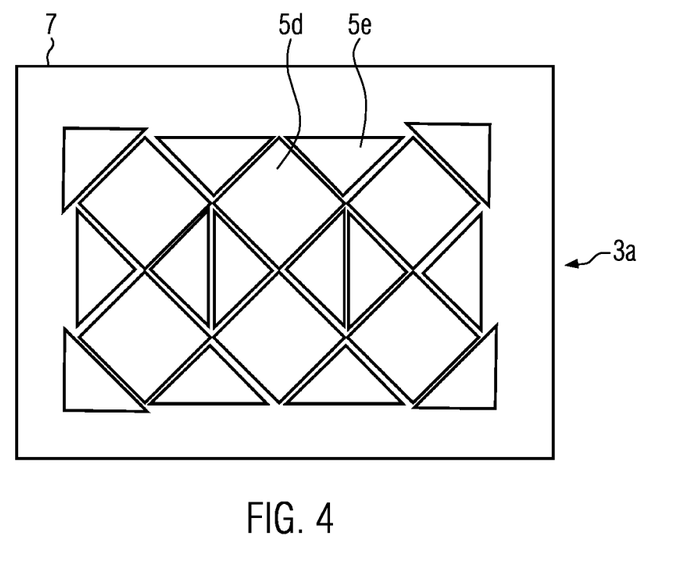
FIG. 4 shows a top view of a third example of a handling unit assembled according to the disclosure.

This is also illustrated in FIG. 4, according to which the handling unit layer 3a is formed exclusively by container types 5d, 5e that have a polygonal cross-section. In this example, rectangular and triangular cross-sections are combined in a particularly favorable manner. As was already noted with respect to FIG. 2, in this case, too, the container type 5e provided at the outside could exhibit a particularly great top load carrying capacity, so that the handling unit layer 3a can be loaded with particularly great weight loads, can be stacked in a stable manner and/or is protected particularly well against external forces acting on the sides. Moreover, FIG. 4 illustrates that the different container types 5d, 5e are not only optimally distributed on the handling unit carrier 7 with respect to their position, but that also its rotational position in the top view is adapted in favor of an as high as possible packing density and/or stability of the handling unit layer 3a. In the example, the rotational position of container type 5e having a triangular base area is optimized in this regard.

Figure 5:
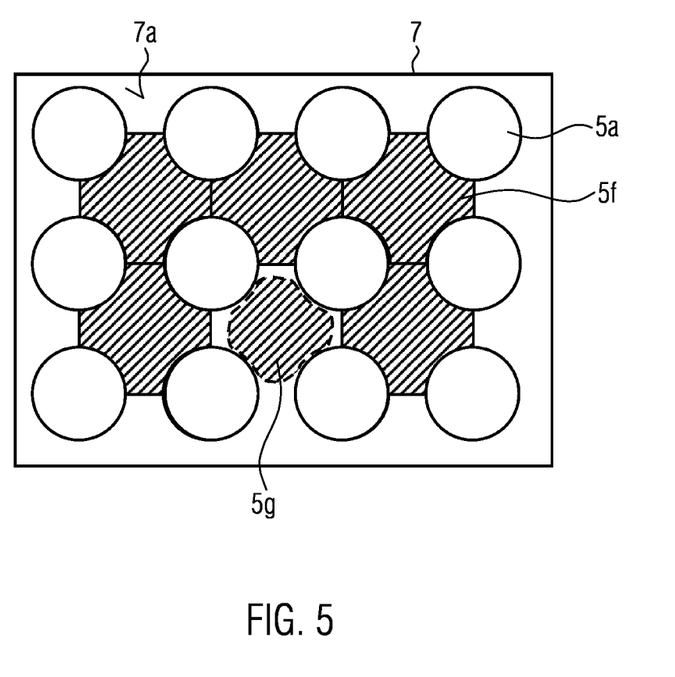
FIG. 5 shows a top view of a fourth example of a handling unit assembled according to the disclosure.

FIG. 5 shows a combination of a first container type 5a with a round cross-section and a (for the sake of simplicity hatched) second container type 5f at whose side walls concave (in the top view) recesses are provided which substantially correspond to the convex (in the top view) outer contour of the first container type 5a. Thus, as compared to the preceding examples, the clearances between the container types 5a, 5f can be further reduced or even be completely avoided. Container types 5a, 5f with outer contours that correspond to each other (in the top view) can be packed to form a compact, block-like handling unit layer 3a which has a particularly high mechanical stability.

As is further outlined in FIG. 5, container type 5f having a concave outer contour could be replaced by a bag-shaped container type 5g. Rigid and, therefore, mechanically stable bottles 5a and flexible bags 5g could thus be combined in a common handling unit layer 3a in an advantageous manner. The bags 5g could here each be pressed between the rigid containers 5a, with the elasticity of the bags 5g allowing, in dependence on the filling level thereof, for an efficient exploitation of the loading area 7a of the handling unit carrier 7. The bags 5g can here adapt their shape at least in sections to the adjacent containers 5a. At the same time, the rigid containers 5a can be arranged in particular in the edge region of the handling unit layer 3a so as to relieve the bags 5g from top loads and protect them from external mechanical influences or produce a stable stack of several handling unit layers 3a, 3a'. Here, it would be advantageous to form the rigid containers 5a higher than the bags 5g. In case of a multiple layer arrangement, like in all other embodiments described, additional stabilizing intermediate layers could be provided, e.g. cartons, so as to favor a uniform load distribution between the individual layers 3a, 3a'.

Figure 6:
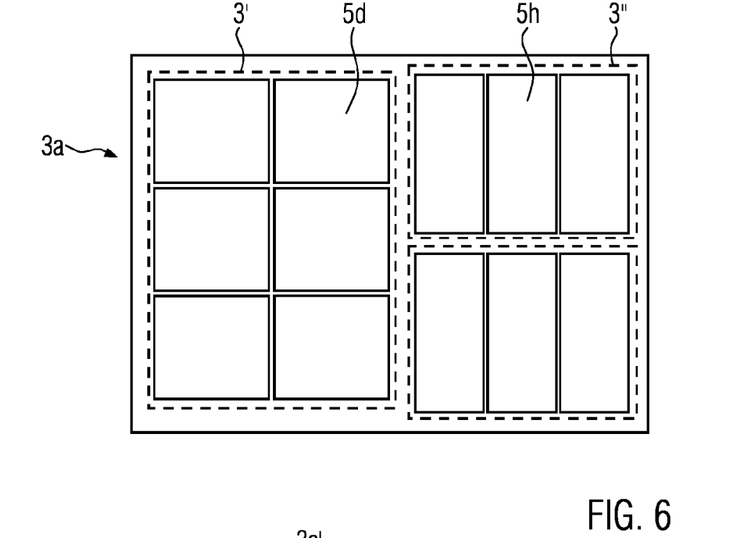
FIG. 6 shows a top view of a fifth example of a handling unit assembled according to the disclosure.

FIG. 6 shows another alternative of a handling unit layer 3a, in which a first collective handling unit 3' with containers of a first container type 5d and a second collective handling unit 3" with containers of a second container type 5h are provided. Thus, it is possible according to the disclosure to assemble individual containers 5 to collective handling units 3', 3" first, and pack up the collective handling units 3', 3" in a transport handling unit subsequently. According to the disclosure the assembly of handling units 3 includes handling units of any type suited for order picking and for the transport of filled containers 5 such as bottles or bags. Also, at least one handling unit carrier 7 is provided. However, a combination of several handling unit carriers 7 in one handling unit 3 is conceivable as well, e.g. if stacked in a suitable manner.

Preferably, the positioning unit 11 is capable of processing several different collective handling units 3', 3" one after the other, e.g. three six-packs, ten twelve-packs, four six-packs etc. Also, different containers 5, for instance also with different filling materials, labels and/or closures, could be parked in individual buffer zones prior to their supply, and could be provided on the handling unit carrier 7 for the positioning thereof, when necessary. The buffer zones used to this end need not necessarily be situated in the region of the positioning unit 11, although this would be advantageous in the favor of a fast supply. They could also be located in the region of the labeling machine or a filler of the respective filling line 17a, 17b.

Figure 7A:
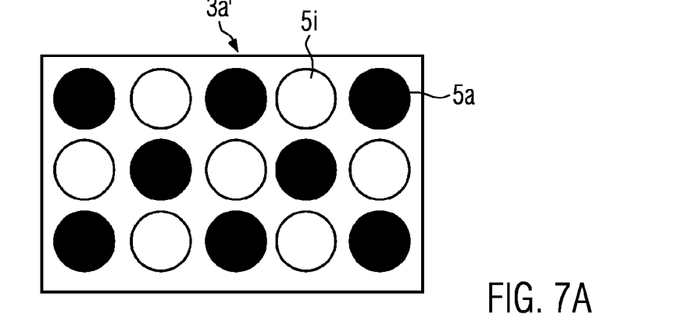
FIG. 7A shows a top view of a sixth example of a handling unit assembled according to the disclosure.
Figure 7B:
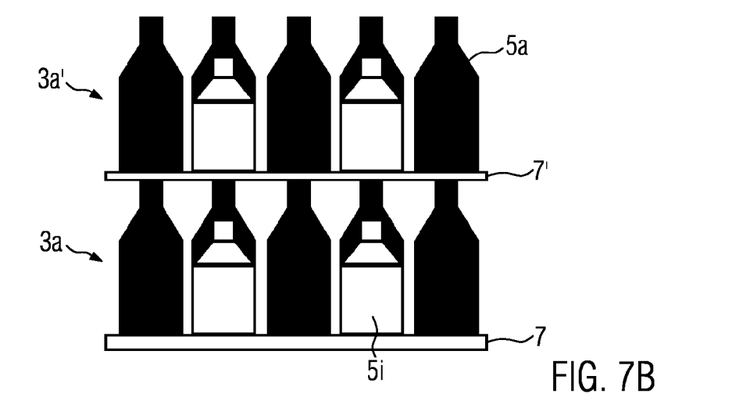
FIG. 7B a lateral view of the handling unit of FIG. 7A.

FIGS. 7a and 7b show alternatives according to which a first, higher container type 5a and a second, lower container type 5i are combined on a handling unit layer 3a. This is particularly advantageous if the first container type 5a has a greater top load carrying capacity than the second container type 5i. In this case, the load of an upper handling unit layer 3a' can be carried by the containers 5 of the first container type 5a of the lower layer 3a. If several layers 3a, 3a' are arranged on top of each other it is particularly advantageous to arrange in the respective lower layer 3a a greater number of containers 5 of the first container type 5a having a greater top load carrying capacity than in the upper layer 3a' (not shown).

Thus, containers 5 having different top load carrying capacities can be distributed on container layers 3a, 3a' arranged on top of each other in such a way that the top load carrying capacity of the layers 3a, 3a' is adapted to the respective load to be carried. Thus, a packing volume available on the handling unit carrier 7 can be exploited particularly efficiently. In other words, it can be avoided that an upper layer 3a' has an unnecessarily great top load carrying capacity, while the carrying capacity of a lower layer 3a is exceeded because a maximally permissible top load carrying capacity of individual containers 5 is exceeded, even though the total load of layer 3a is altogether still low. In this case, too, it is particularly advantageous to arrange the containers 5 that have a great top load carrying capacity in the edge region, especially at the corner positions 3b of the respective container layer 3a, 3a'.

For the sake of clarity an upper intermediate layer 7' is illustrated in FIG. 7b, which, with respect to the functions of the device 1 according to the disclosure and the realization of the method according to the disclosure, can assume the same function as the lower handling unit carrier 7. However, the intermediate layer 7' could also be provided merely for stabilization purposes or to simplify the positioning of the containers 5 or to simplify the handling when the handling units 3 are delivered. Also, the intermediate layer 7' could consist of the handling unit carrier 7.

The numbering of the containers 5 as first, second, third container type etc. is, in each case, related to a handling unit 3 according to the disclosure, and is not bound to specified shapes, sizes, materials or mechanical properties of the embodiments described by way of examples. Thus, any one of the illustrated container types 5a-5i according to the disclosure could be the first or second container type of a specific handling unit alternative.

The disclosure was described by means of one single positioning unit 11, which place all containers 5 onto the handling unit carrier 7 to be loaded. It would also be possible, however, that the different containers 5 be provided by different positioning units 11 which load the handling unit carrier 7 successively. This can facilitate the handling of specific container types and/or further increase the flexibility of the device 1 according to the disclosure.

The following operation is possible with the method according to the disclosure:

A continuous flow P of containers 5 to be picked, consisting of at least a first container type 5a and a second container type 5b, is fed to the supply unit 9 from at least one filling line 17a, 17b. The containers 5 are each provided with identification signs 13a, 13b, allowing the positioning unit 11 to assign the supplied containers 5 to the different container types 5a, 5b.

A device not described in more detail provides for a handling unit carrier 7 to be loaded in the region of the positioning unit 11. Based on a request, which is transmitted from the control unit 15 to the positioning unit 11, a predetermined number of containers 5 of the first container type 5a and a predetermined number of containers 5 of the second container type 5b are received by the supply unit 9 and are arranged on the handling unit carrier 7 at the free positions provided therefor.

In this respect, it is irrelevant for the disclosure in what order the container types 5a, 5b are arranged on the handling unit carrier 7. Preferably, the arrangement of the individual containers 5 is accomplished to allow a capacity utilization of the supply unit 9, e.g. of individual supply lanes 9a, 9b, that is as uniform as possible and/or the assembly of the containers 5 to form a handling unit with a high packing density in a shortest possible time.

The marking and assignment of the containers 5 with respect to the container types 5a, 5b is preferably accomplished as they run through the associated filling line 17a, 17b, especially during the filling and/or inspection of the containers 5, where appropriate also during the production of the containers 5, by applying a marker to the containers 5 and/or by assigning an electronic position marker with respect to the running production flow P.

After loading the handling unit carrier 7 with a lower handling unit layer 3a, which consists of the containers of the first container type 5a and the second container type 5b, another handling unit layer 3a' is arranged on the handling unit carrier 7, depending on the request from the control device 15 and/or the progress of the process, or this handling unit carrier 7 is transported further for the further processing thereof and is replaced by an empty handling unit carrier 7 so as to load the same in correspondence with a new instruction from the control unit 15.

The invention claimed is:

1. Method for assembling a handling unit of filled containers in a filling plant, comprising:
    a) supplying the filled containers, the containers comprising at least a first and a second container type, and the first and second container type being different with respect to at least one container parameter from the following group of parameters: height, base area, base area shape and the mechanical load capacity of the container; and
    b) arranging the supplied containers on a handling unit carrier, wherein the arrangement of the containers with respect to at least one of a number, a location, and a rotational position of the containers on the handling unit carrier is made in dependence on the at least one container parameter of the first and second container type.

2. The method according to claim 1, wherein the first container type has a greater top load carrying capacity.

3. The method according to claim 1, wherein the first container type has a greater top load carrying capacity than the second container; and the containers are arranged in at least one upper and one lower layer on the handling unit carrier in such a way that the number of the containers of the first container type in the lower layer is greater than in the upper layer.

4. The method according to claim 1, wherein the first container type has a greater top load carrying capacity than the second container; and the containers are assembled to form, in a top view, a polygonal handling unit, with containers of the first container type being arranged at corner positions of the handling unit.

5. The method according to claim 1, wherein the pressure in the containers of the first container type is higher than the pressure in the containers of the second container type.

6. The method according to claim 1, wherein the containers of the first container type are bottles and the containers of the second container type are bags.

7. The method according to claim 1, wherein the respective containers of the first and of the second container type have different base areas; at least the base area of the first or of the second container type is polygonal; and at least two boundary lines of adjacent polygonal base areas are oriented in parallel or orthogonally relative to each other.

8. The method according to claim 1, wherein each of the respective containers is assigned at least one identification sign corresponding to the respective container type; and the supply in step a) and/or the arrangement in step b) are controlled in dependence on the at least one identification sign.

9. The method according to claim 8, wherein the identification sign is applied to the containers, and/or the identification sign is an electronic position marker of the respective container with respect to the running production flow.

10. The method according to claim 1, wherein the supply in step a) and/or the arrangement in step b) are performed automatically on the basis of a picking order.

11. The method according to claim 1, wherein the respective containers of the first and of the second container type are supplied in step a) by a shared disposable container line, or the containers of the second container type are supplied by a disposable container line and the containers of the first container type are supplied by a parallel-operated reusable container line.

12. Method for producing a handling unit of filled containers in a filling plant, comprising the method according to claim 1 as well as a method for stretch blow molding the containers to be filled from preforms, comprising preheating the preforms independently of each other and, during the blowing, stretching the preforms by means of separate linear motor drives or servo drives, and/or blowing the containers at different pressures and/or blowing times.

13. The method according to claim 2, and wherein the first container type is higher than the second container type.

* * * * *